United States Patent Office 3,483,700
Patented Dec. 16, 1969

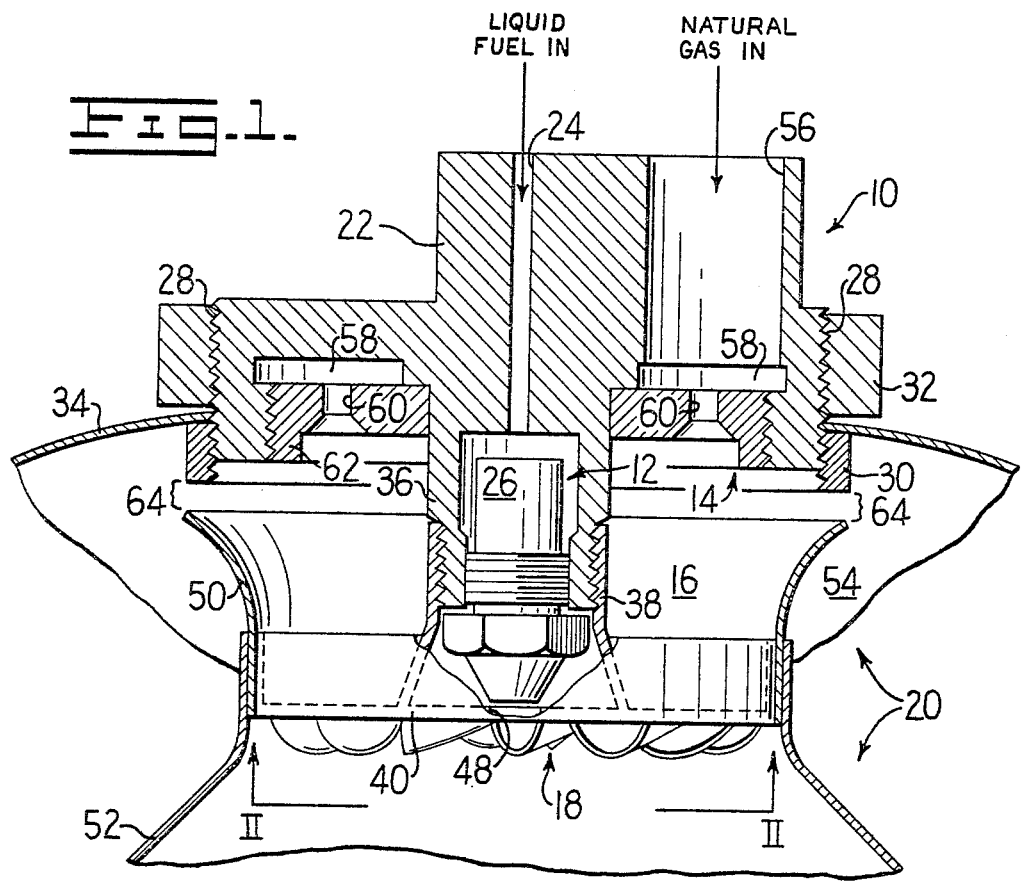
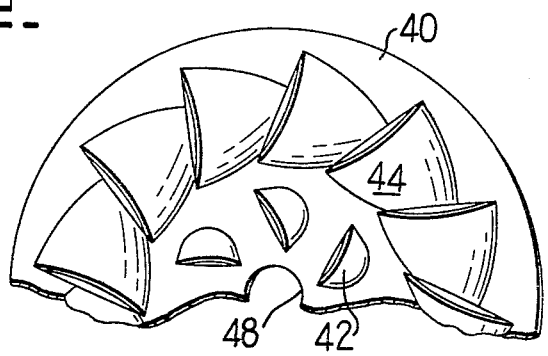

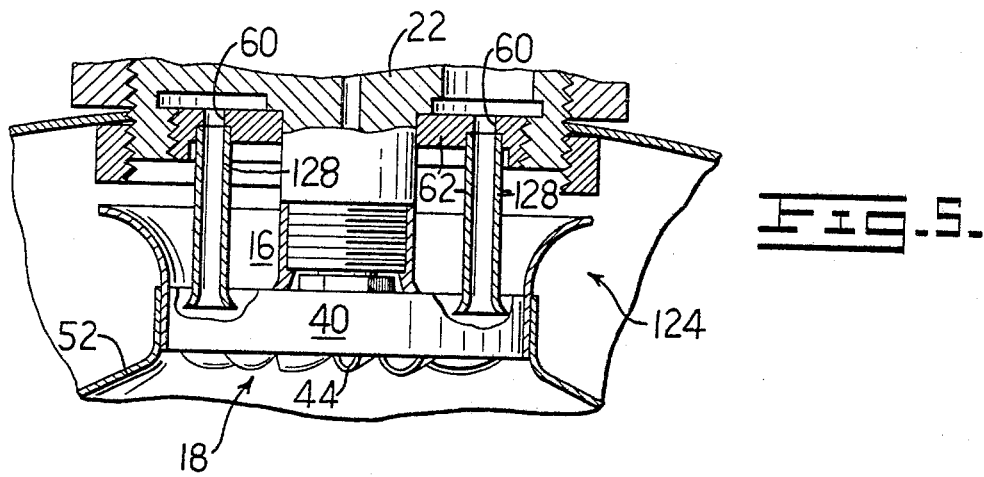
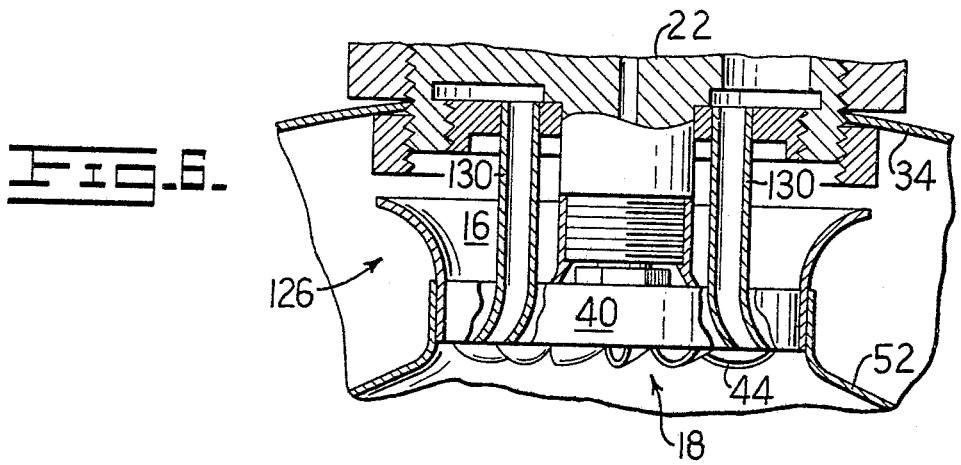
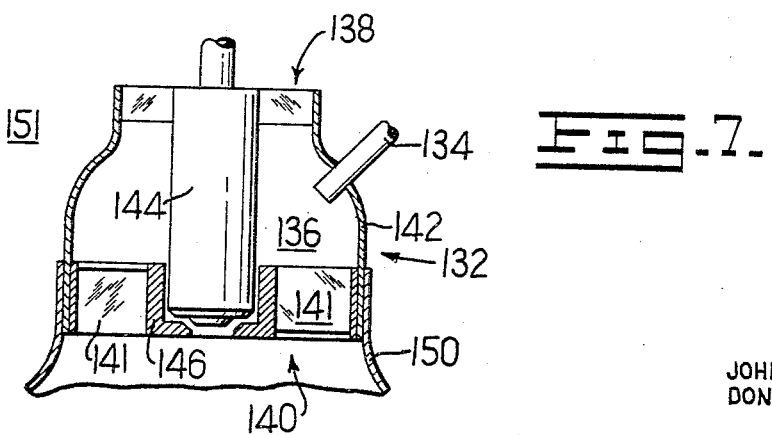

3,483,700
DUAL FUEL INJECTION SYSTEM FOR GAS TURBINE ENGINE
John G. Ryberg, Peoria, Ill., and Donald E. Tjarksen, North Muskegon, Mich., assignors to Caterpillar Tractor Co., Peoria, Ill., a corporation of California
Filed Sept. 27, 1967, Ser. No. 670,861
Int. Cl. F02g 1/00, 3/00; B05b 7/10
U.S. Cl. 60—39.74      10 Claims

ABSTRACT OF THE DISCLOSURE

A dual fuel injection system uses a premix chamber into which natural gas may be released upstream of the combustor dome at a relatively low injection pressure and be mixed with compressed air prior to introduction of the mixture into the combustion chamber. The construction allows instant changeover between gas and liquid operation while the engine is operating under any load.

BACKGROUND OF THE INVENTION

Various single and dual fuel injection systems are available for use in providing a blended mixture of air and a selected type of fuel into the combustion chamber of a gas turbine engine. Of particular interest here are dual fuel injection systems, which inherently exhibit the problem of providing stable combustion; especially during the transient periods when switching from gaseous fuel to liquid fuel, and vice versa.

In conventional dual fuel injection systems, gas has been injected substantially directly into the combustion chamber without the benefit of premixing with air. In such fuel injection systems it has been necessary to boost the pressure of the natural gas fuel to some value substantially larger than the ambient pressure within the combustion chamber to insure proper mixing during fuel injection.

Natural gas is frequently available only at relatively low pressures (below 40 p.s.i.). An auxiliary gas pump is normally used to boost the line pressure to a value above the pressure in the compressed air plenum (which, for example, is of the order of 60 p.s.i.). The pump pressure required must include the pressure drop across the control system as well as the pressure drop across the gas inlet ports.

In addition, in other conventional dual fuel injection systems the gaseous fuel is supplied substantially directly into the region of the combustion dome, around the periphery of the liquid fuel injection nozzle. This configuration increases the possibility of insufficiently mixing the natural gas and air prior to combustion. The pressure drop across the entering gas ports is comparable to that experienced in a gas fuel, single injection nozzle.

Some industrial gas turbine engines have the capability of switching automatically from liquid to gaseous fuel, or vice versa, while operating under load. This feature is advantageous for several reasons. For example, the feature enables an engine to continue running if an emergency or a power failure interrupts one of the fuel supply systems. It may also provide lower total fuel cost, since lower rates are sometimes offered to consumers who have the ability to use certain fuel intermittently, such as natural gas. Also, in natural gas compressor installations which pump natural gas through large pipelines the engine may be started on liquid fuel and then switched to natural gas under load. However, the conventional dual fuel systems often require the pipeline gas to be raised to the required injection pressure. This in turn can require a separate gas compressor for engine use alone.

SUMMARY OF THE INVENTION

The present invention includes a gaseous fuel and a liquid fuel injection system having a chamber for premixing the gaseous fuel with compressed air prior to injecting the mixture into the combustion chamber. In the preferred embodiments, the invention introduces the gaseous fuel from ejector ports at a point upstream from the combustor dome. A generally conventional liquid fuel injector means is located centrally within an outer gaseous fuel injector means. Both injector means communicate with a combustion chamber. However, the gaseous fuel injector means, in the preferred embodiments, are disposed in direct communication with a premix chamber. The premix chamber in turn is coupled to the combustion chamber.

The premixing of gaseous fuel provides relatively stable and efficient gas combustion within a dual fuel injection system, without the need for a booster compressor. The construction of the premix chamber and the manner in which the premix chamber is operatively associated with the combustion chamber prevents the flame from flashing back into the injection system.

The invention further provides, in the various embodiments thereof, the advantages of a combustion chamber of relatively simple construction, an air orifice or restriction at the premix chamber entrance to control the air-to-fuel ratio to aid mixing and to prevent the gas from escaping, a mixture directing cone or member, and a scoop or deflecting vane type swirler at the outlet of the premix chamber to aid turbulent mixing in the combustion chamber proper and to act in part as a flashback flame barrier. The premix embodiment further permits a lower pressure drop across the gas inlet ports. This latter advantage saves on pump power because the gas may thus be supplied at a lower initial pressure, or a larger pressure drop across the fuel control system itself may be allowed thereby providing improved response.

BRIEF DESCRIPTION OF THE DRAWINGS

FIGURE 1 is a cross-section view of a duel fuel injection system constructed in accordance with one embodiment of the present invention.

FIGURE 2 is a partial view taken along section line 2—2 of FIGURE 1.

FIGURES 3, 4, 5, 6 and 7 are cross-section views showing modifications of the invention shown in FIGURE 1.

DETAILED DESCRIPTION OF THE PREFERRED EMBODIMENTS

Figure 3:
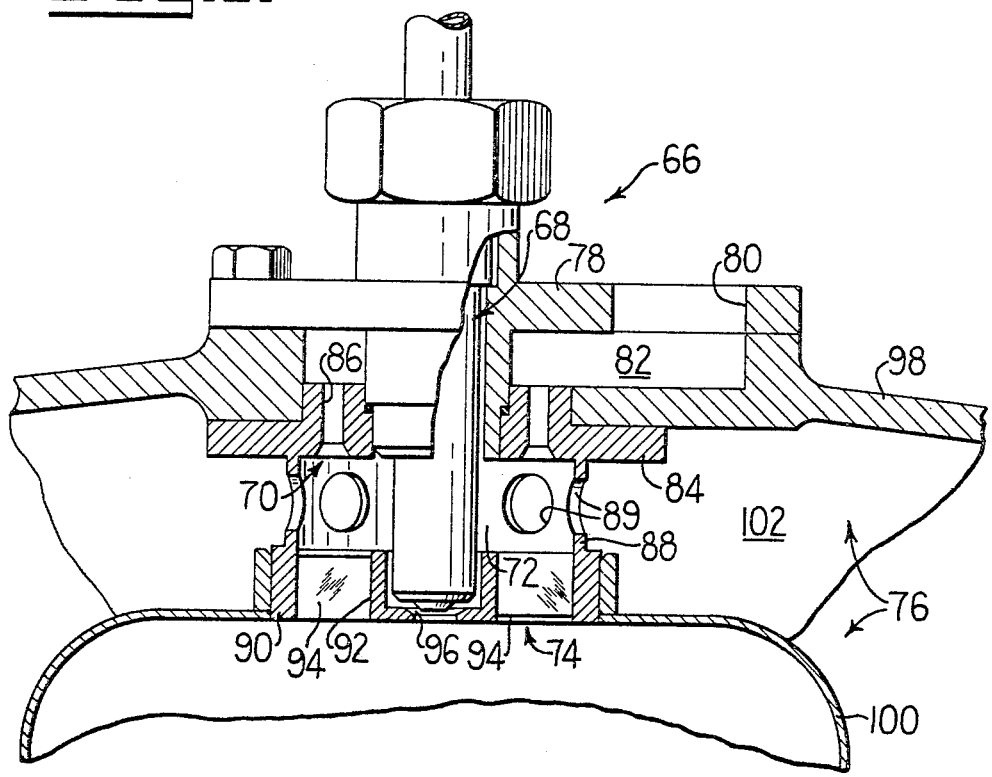

Referring to FIGURES 1 and 2, there is shown a preferred embodiment 10 of a dual fuel injection system of the invention.

The injection system generally includes a combustor 20 embodying a central liquid fuel injection means 12, outer natural gas fuel injection means 14, a premix chamber 16, and a swirler means 18 adjacent a combustion chamber.

For the most part, the liquid fuel injection means 12 is conventional in design.

The injection means 12 and 14, as well as the remaining components, are disposed within, or otherwise generally secured to, a supporting fuel manifold block 22.

A fluid inlet 24, centrally formed through the block 22, couples a pressure atomizing fuel nozzle 26 to a liquid fuel source (not shown). The nozzle 26 may be either a single or a multiple orifice nozzle. In liquid fuel operation, the pressure atomizing fuel nozzle 26 injects the atomized liquid fuel into the interior of a combustion chamber liner 52, at the outlet side of swirler vanes 18, and within the dome portion of the liner.

As shown in FIGURE 1, the fuel manifold block 22 has a threaded, external peripheral surface 28 which receives threaded nuts 30 and 32. The threaded nuts confine the respective ends of an external housing 34. The block 22 has a central hub 36, which is threaded along its outer periphery to receive a threaded cylindrical member 38. Member 38 is flared outwardly along a portion thereof opposite the threaded end, and is integrally secured to, or formed as a part of, a plate 40 of the swirler means 18.

As shown in FIGURE 2, a double series of "thumbnail" scoops 42 and 44 are secured to, or otherwise formed as a part of, the plate 40 in register with respective holes in the plate. The innermost series of scoops 42 is shown herein as smaller than the scoops 44 forming the outermost series; however, other combinations of sizes may be utilized.

The member 38 is preferably connected to the plate 40 generally concentrically between the two series of scoops 42 and 44. The nozzle 26 is disposed in register with an aperture 48 to allow ejection of liquid fuel therefrom into the combustor means 20.

A swirler cone 50, having a flared inlet end as shown, is integrally secured at its outlet end to the swirler 18. The flared end terminates a selected and adjustable distance from the nut 30 to provide an annular shaped inlet orifice of restricted area for the premix or plenum chamber 16.

The liner 52 and cone 50 form an inner wall within the housing 34 to define an annual air plenum 54.

A gas inlet 56 for the natural gas communicates with a distributing manifold 58. A series of spaced distributing ports 60 are formed in a port plate 62 which is threadably secured within the block 22 concentrically about the hub 36. The ports 60 communicate with the manifold 58 and the premix chamber 16, and have a flared cross-section to provide a diffusing effect to the gas injected into the premix chamber 16.

As may be seen, the premix chamber 16 is generally defined by the facing radial surface of the port plate 62, the plate 40 and the flared end of the swirler cone 50.

For natural gas injection, natural gas is supplied, for example, at about 1 p.s.i.g. above the pressure in the air plenum 54, to the distributing manifold 58 and through the series of distributing ports 60 to enter the premix chamber 16.

As noted above, the premix chamber 16 is separated from the air plenum 54 by means of an annular air metering orifice or restriction 64. The purpose of the restriction 64 is to insure that the gas-to-air ratio mixture is richer than the upper limit of combustible ratios to prevent combustion reactions from flashing back through the swirler means 18 into the premix chamber 16, and also to contain and direct such mixture into the combustion chamber liner 52. If the gas-to-air ratio mixture is less rich than the upper limit of combustible ratios, flash back would still be prevented because the mixture flows out of the premix chamber faster than the burning mixture's rate of flame travel. Once the gas-air mixture is passed through swirler means 18, additional air necesary to support combustion is passed through suitable porting in dome 52 from plenum 54.

The swirler cone 50 is also provided to insure containment of the mixture, thus preventing it from entering the combustion chamber at some location other than at the swirler means 18.

The relationship of these components prevents the natural gas from spilling outwardly into the compressed air plenum 54 past restriction 64.

The premixture of natural gas and air from annular air plenum 54 is directed from the premix chamber 16, through the double series of "thumbnail" scoops 42 and 44. Passing the premixture through the scoops 42 and 44 imparts a turbulent swirling effect thereto which improves the subsequent combustion of the gas. Selected designs of the swirler scoops provide for a flow velocity of the gas, or air and gas mixture, which is greater than the value of the propagating flame velocity of the gases passing through the swirler means 18. This prevents the flashback of combustion reactions from inside the combustion chamber into the gas plenum or premix chamber 16.

The invention, which provides for the injection of gas into the combustion chamber through the premix chamber 16 and the swirler means 18, takes advantage of the gas distributing characteristics of the swirler means 18. That is, the swirler means properly distributes the gas throughout the combustion chamber cross-sectional area, and does so at an injection pressure that is near or equivalent to the aerodynamic pressure loss across the combustor 20. Thus, the maximum gas pressure level is minimized, as in contrast to a gas injector or nozzle in which the issuing gas orifices are located inside a combustion chamber and wherein a higher gas injection pressure is necessary to produce the required gas momentum for proper distribution of the gas throughout the chamber.

Referring now to FIGURE 3, another embodiment utilizing a different nozzle and swirler configuration is indicated generally by the numeral 66. This embodiment includes a combustor 76 having liquid fuel injection means 68, natural gas injection means 70, a premix chamber 72, swirler means 74, and fuel manifold block 78. The components 68–78 are analogous in general arrangement and in function to the components 12–22 of the embodiment 10 of FIGURE 1. However, the specific construction of the components is different.

The natural gas injection means 70 comprises a gas inlet 80, a gas distributing manifold 82, and a port plate 84 with a spaced series of flared gas ports 86. The ports 86 communicate with the premix chamber 72 and the manifold 82.

The premix chamber 72 is defined not by a flared swirler cone, such as cone 50 of FIGURE 1, but by a cylindrical member 88 integrally formed at one end to port plate 84, and at the other end to the swirler means 74. The member 88 has spaced air metering orifices or apertures 89 which regulate and contain the mixing of air-to-gas, like the restriction 64 of FIGURE 1.

The swirler means 74 include a double-walled swirler member 90 having an annular gas passage 92 within which are arranged a series of swirler vanes 94.

An annular air passage 96 is provided between the nozzle of liquid fuel injection means 68 and the inner wall of the double-walled swirler member 90.

As in FIGURE 1, the combustor 76 includes an external housing 98, and a combustion chamber liner 100 at a spaced distance from the housing 98 to define an air plenum 102. The housing 98 and liner 100 are secured to the fuel manifold block 78 and swirler means 74.

The embodiment 66 of FIGURE 3 operates in a manner similar to that of FIGURE 1. Natural gas is supplied via inlet 80, manifold 82 and ports 86, to premix chamber 72 where the gas is mixed with air supplied under pressure from the air plenum 102 through air metering orifices 89. After mixing in the premix chamber 72, the mixture flows into the chamber liner 100 via the swirler 74 which imparts a turbulent, swirling action to the mixture.

Figure 4:
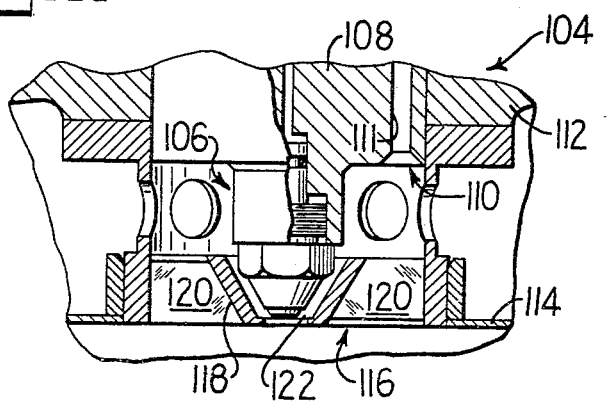

Referring to FIGURE 4, there is shown another embodiment 104 of the invention, wherein the nozzle and swirler configuration is somewhat different than that of FIGURE 3, but the remaining components are essentially the same. A liquid fuel injection nozzle 106 is centrally disposed as a part of fuel manifold block 108, and natural gas injection means 110 are formed within the block 108 generally about nozzle 106.

In this embodiment, a series of gas ports 111 are provided, not in a port plate such as plate 84 of FIGURE 3, but in the manifold block 108 itself.

As in FIGURE 3, a combustor housing 112 and a liner dome 114 are secured to the block 108 and swirler means 116 respectively.

The swirler means 116 are of the same general, double-walled configuration as swirler means 74 of FIGURE 3, but include a conical rather than a straight inner wall 118. Thus, a series of swirler vanes 120 have a continuously increasing length which provides a diffusion effect. An annular air passage 122 extends between the nozzle of the injection means 106 and the conical inner wall 118.

Referring to FIGURES 5 and 6, there are shown other embodiments 124 and 126 of the invention, which have configurations quite similar to that of embodiment 10 of FIGURE 1. However, embodiments 124 and 126 include natural gas injection tubes 128 and 130 respectively, which are each particularly designed and positioned to insure admission of gas at a location sufficiently far within the air flow stream of the swirler means 18 to prevent flow back to the chamber surrounding the liner of the combustion chamber. Tubes 128 are secured at one end to the port plate 62 in registration with respective ports 60. The other ends of the tubes 128 extend across most of the axial length of the premix chamber 16 to terminate adjacent the swirler plate 40 of the swirler means 18. The ends of tubes 128 are flared outwardly, and gas introduced immediately adjacent the swirler plate 40 (and thus the scoops 42 and 44) is immediately premixed with air and is swirled through the scoops into the combustion chamber. Accordingly, flow-back of the mixture of gas and air is prevented.

In FIGURE 6, the tubes 130 are terminated, at the end thereof towards the liner 52, within respective scoops 44 of the swirler plate 40 whereby the gas introduced thereby is passed directly into the turbulent, swirling air stream which is passing through the swirler scoops 42 and 44. Thus, the gas is premixed immediately upon introduction to the scoops 44, which are creating a turbulent effect, whereby the mixture of gas and air is simultaneously mixed and injected into the chamber for subsequent combustion.

FIGURE 7 shows another embodiment of the invention indicated generally by the numeral 132. Gas is injected through one or more tubes 134 into a premix chamber 136. The chamber is defined between an inlet orifice 138 (which may include inlet vanes) and mixture swirler means 140 having another series of vanes 141.

This configuration is adaptable to a multi-combustion chamber arrangement (not shown) embodying two or more axially arranged combustion chambers. In such an arrangement, liquid and gaseous fuels might be supplied through annular tube type manifolds (not shown) interconnecting the multi-combustion chamber arrangement.

The bell shaped housing 142 encloses the premix chamber 136.

A central liquid fuel injection nozzle 144 extends through an aperture in a double-walled member 146 of swirler means 140. The member 146 is similar in construction to the double-walled member 90 of FIGURE 3.

The swirler vanes 141 are disposed in the annular space between the walls of the member 146. The mixture of gas from tubes 134 and the air from air inlet 138 is introduced to a liner 150 which is secured to the outer circumference of the housing 142.

In this embodiment, a plenum chamber 151 surrounds the housing 142 and the premix chamber 136. The plenum 151 may be an annular chamber in the fuel injection zone of an annular combustion chamber (not shown) or a simple plenum in a can combustor.

The tubes 134 inject a combustible gas into the premix chamber 136 upstream of the swirler means 140.

The embodiment 132 may include pre-swirl vanes in the orifice 138.

Air flows through the orifice 138 and into the premix chamber 136 and thence into the can combustor 150 when the combustible gas is not being injected.

This swirled air is usually 5 to 10% of the total air passing into the liner 150 and advantageously creates good air and gas mixing characteristics in the combustion chamber with attendant improved flame stabilization. During the combustion of gas, the volume rate of the gas is usually less than the swirler air normally passing through the premix chamber 136. During gas injection, the combustible gas displaces the same volume of swirled air and enters the combustion chamber through the vanes 141 of the swirler means 140. Under most engine operating conditions, the displacement of swirled air that normally passes through the premix chamber 136 will cause a combustible gas-air mixture which is too rich to support combustion in the premix chamber 136. The effective flow area of the swirler means 140 should be large enough so that the maximum combustible gas volume flow rate will pass through the swirler means 140 when subjected to the aerodynamic pressure differential across the swirler means to thus keep the gas from going into the combustion chamber somewhere else.

Although the invention has been described with respect to several embodiments, further modifications are possible within the spirit of the invention.

What is claimed is:
1. A dual fuel injection system comprising
   a combustion chamber having
      an inlet and
      a swirler mounted in said inlet so that substantially all fluid passing through said inlet must pass through said swirler,
   a premix chamber communicating with said combustion chamber through said inlet,
   a liquid fuel injector mounted in said premix chamber adjacent said swirler,
   a combustion air source within said premix chamber, and
   a gaseous fuel injector in said premix chamber and positioned relative thereto such that, when gaseous fuel is passed through said gaseous fuel injector, it is mixed with combustion air prior to being exhausted from said swirler into said combustion chamber.

2. The dual fuel injection system of claim 1 wherein said combustion air source is positioned between said liquid fuel injector and said gaseous fuel injector, relative to the axis of said premix chamber.

3. The dual fuel injection system of claim 2 including means for adjusting said combustion air source so as to control combustion air volume.

4. A dual fuel injection system comprising
   a combustion chamber having an inlet in which a swirler is mounted,
   a premix chamber adjacent said combustion chamber and in communication with said inlet,
   a liquid fuel injector mounted in said premix chamber adjacent said inlet,
   a source of combustion air in said premix chamber,
   a gaseous fuel injector mounted in said premix chamber and comprising
      a manifold means having a gas inlet formed therein, and
      an annular port plate coaxially disposed adjacent said manifold means and about said liquid fuel injector means and having
         a series of gas ports providing communication between said manifold means and said premix chamber for injection of gaseous fuel into said premix chamber wherein it is mixed with combustion air from said source prior to being exhausted from said swirler into said combustible chamber.
         tion chamber.

5. The injection system of claim 4 wherein said swirler means further comprises a series of deflectors, and a support member secured generally within said premix chamber supports said swirler means at said inlet.

6. The injection system of claim 4 wherein a housing between said annular port plate and said swirler means includes a swirler cone with a flared inlet first end and secured at its second end to the swirler means, the flared end terminating adjacent said manifold means to define an air metering orifice which comprises said source of combustion air.

7. The injection system of claim 4 wherein a housing between said manifold means and said swirler means includes a cylinder extending from said manifold means to said swirler means, and having formed within the walls thereof a spaced series of openings which in combination define said single air source situated in the combustor.

8. The injection system of claim 4 wherein each of said gas ports further includes a tube secured to the port plate in registration with its respective gas port and extending axially therefrom to terminate within the premix chamber in close proximity to said swirler means.

9. The injection system of claim 4 wherein each of said gas ports further includes a tube secured to the port plate in register with its respective gas port and extending axially therefrom to terminate in register with respective deflectors in the swirler means to thus instantly premix air and gas during injection thereof into said combustion chamber.

10. The system of claim 4 including means on said swirler means for changing the direction of the combustion air as it passes through the combustion chamber inlet.

References Cited

UNITED STATES PATENTS

| 2,344,936 | 3/1944 | Zink | 431—187 X |
| 3,174,527 | 3/1965 | Reed et al. | 431—181 |
| 3,236,279 | 2/1966 | Beyer | 431—182 X |
| 3,067,582 | 12/1962 | Schirmer | 60—39.74 |
| 3,285,316 | 11/1966 | Gustafson | 239—406 |
| 3,341,131 | 9/1967 | Stallkamp | 239—427.3 |
| 3,349,826 | 10/1967 | Poole | 239—406 |

MARK M. NEWMAN, Primary Examiner

DOUGLAS HART, Assistant Examiner

U.S. Cl. X.R.

239—400; 431—187

PO-1050
(5/69)

UNITED STATES PATENT OFFICE
CERTIFICATE OF CORRECTION

Patent No. 3483700                Dated December 16, 1969

Inventor(s)   JOHN G. RYBERG, et al

It is certified that error appears in the above-identified patent and that said Letters Patent are hereby corrected as shown below:

Column 6, line 72, "combustible" should read --combustion-- line 74, "tion chamber." should be deleted.

SIGNED AND
SEALED
JUL 28 1970

(SEAL)
Attest:

Edward M. Fletcher, Jr.
Attesting Officer

WILLIAM E. SCHUYLER, JR.
Commissioner of Patents